United States Patent Office 3,336,115
Patented Aug. 15, 1967

3,336,115
SEPARATELY CRYSTALLIZING BORIC ACID AND ALKALI SULFATE FROM AQUEOUS SOLUTION BY EVAPORATION AT DIFFERENT TEMPERATURES
William T. Reburn, Trona, Calif., and Herbert R. Foster, Jr., Seattle, Wash., assignors to American Potash & Chemical Corporation, Los Angeles, Calif., a corporation of Delaware
Filed Nov. 21, 1963, Ser. No. 325,333
3 Claims. (Cl. 23—296)

ABSTRACT OF THE DISCLOSURE

A cyclic process for the continuous recovery of solid phase boric acid and solid phase sulfate salts from a dilute aqueous feed solution containing boric acid, sodium sulfate and potassium sulfate. The process includes the continuous evaporation of water from the feed solution at first temperature whereby solid phase boric acid is generated and removed followed by heating the resulting filtrate to a higher temperature with evaporation of water to generate solid phase sulfate salts. Upon removal of said solid phase sulfate salts, the remaining filtrate is recycled for retreatment with additional quantities of fresh aqueous feed solution.

---

The present invention relates to the recovery of substantially pure boric acid from a liquid saline mixture. More particularly, the present invention relates to the efficient recovery of substantially pure boric acid from a dilute aqueous four component system containing boric acid, sodium sulfate, potassium sulfate and water.

A large number of aqueous liquid salt systems containing mixtures of dissolved inorganic salts are known. Various procedures for the separation of these aqueous liquid mixtures into their component salts had been proposed. Generally, considerable difficulty had been experienced in separating substantially pure component salts from dilute multi-salt mixtures. Particular difficulty had been encountered in the separation of substantially pure boric acid from dilute aqueous multi-salt mixtures.

The present invention provides a convenient process for the efficient separation of substantially pure boric acid from a dilute aqueous mixture of sodium sulfate, potassium sulfate and boric acid. An additional feature of the present invention is that substantially pure sodium sulfate, substantially pure glaserite or substantially pure potassium sulfate may be recovered from mixtures containing the same utilizing the present process.

Figure 1:
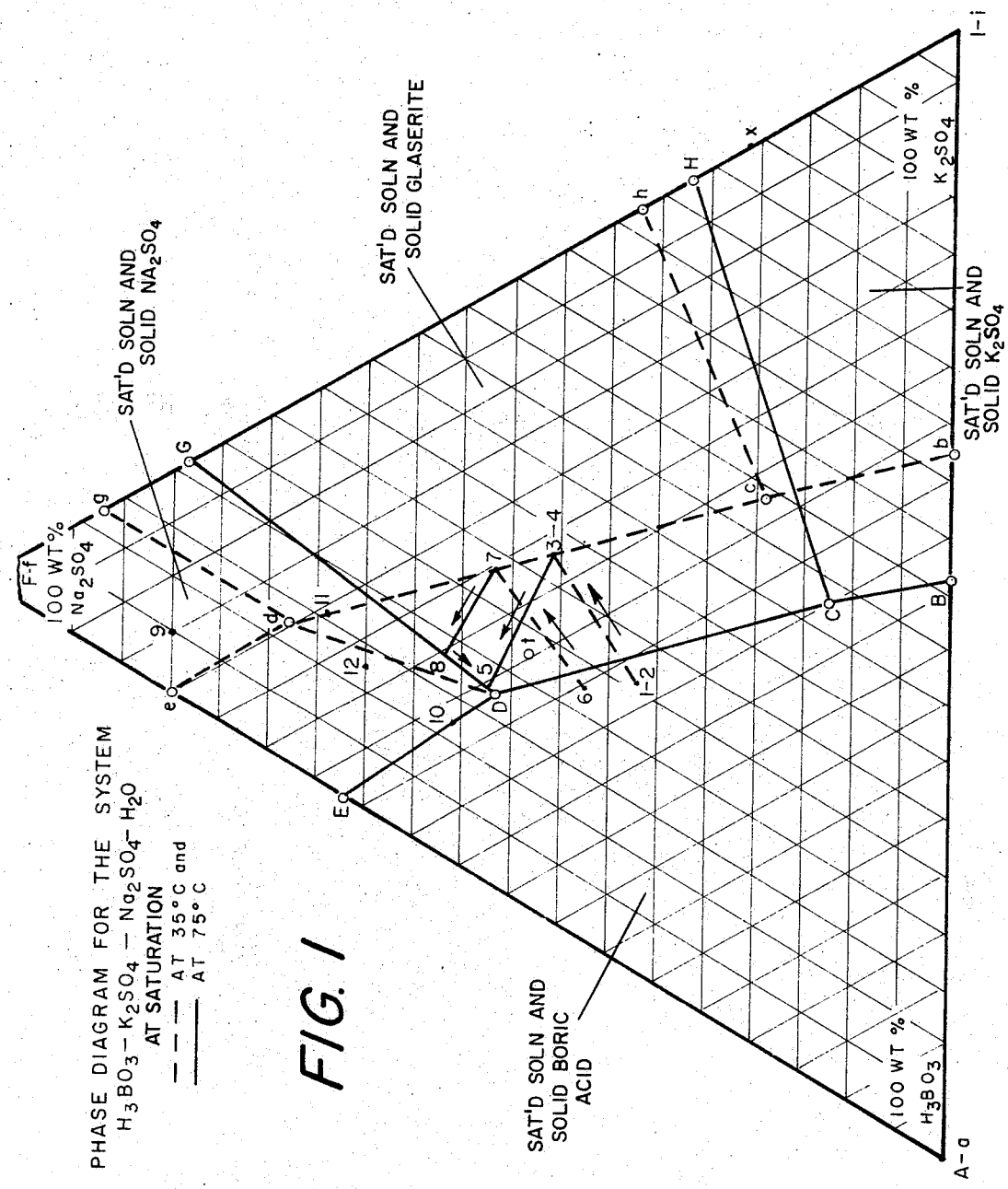

The solubility and equilibrium relationships of the four component system $H_3BO_3$—$Na_2SO_4$—$K_2SO_4$—$H_2O$ are graphically illustrated in FIG. 1.

Figure 2:
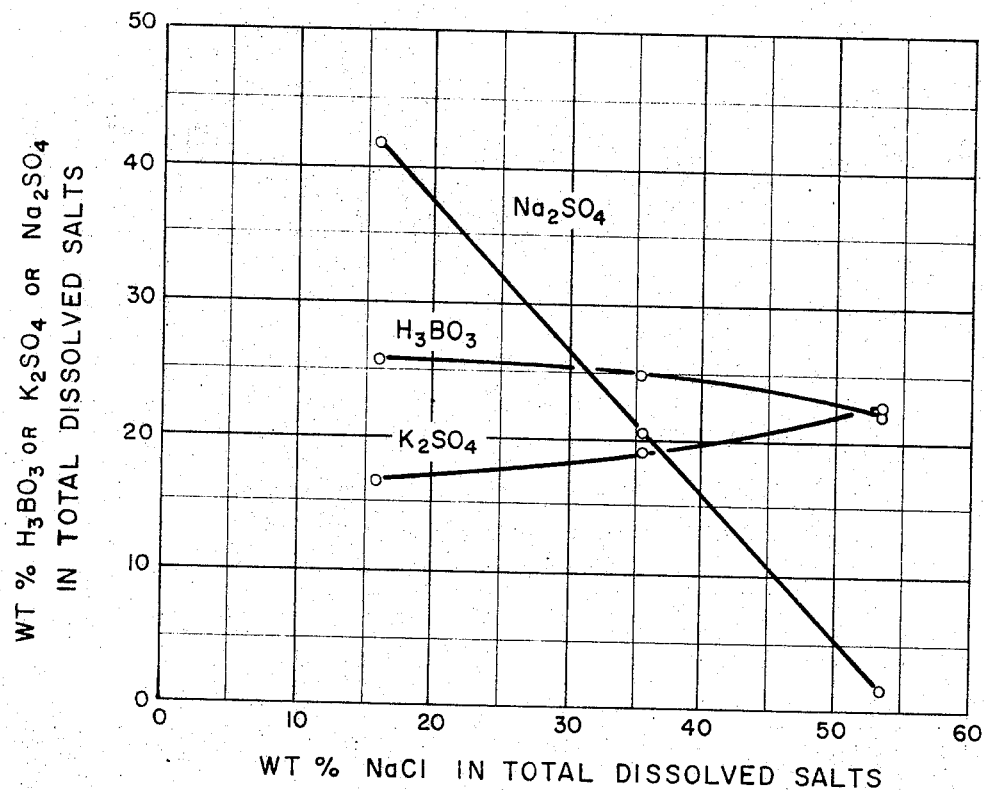
Figure 3:
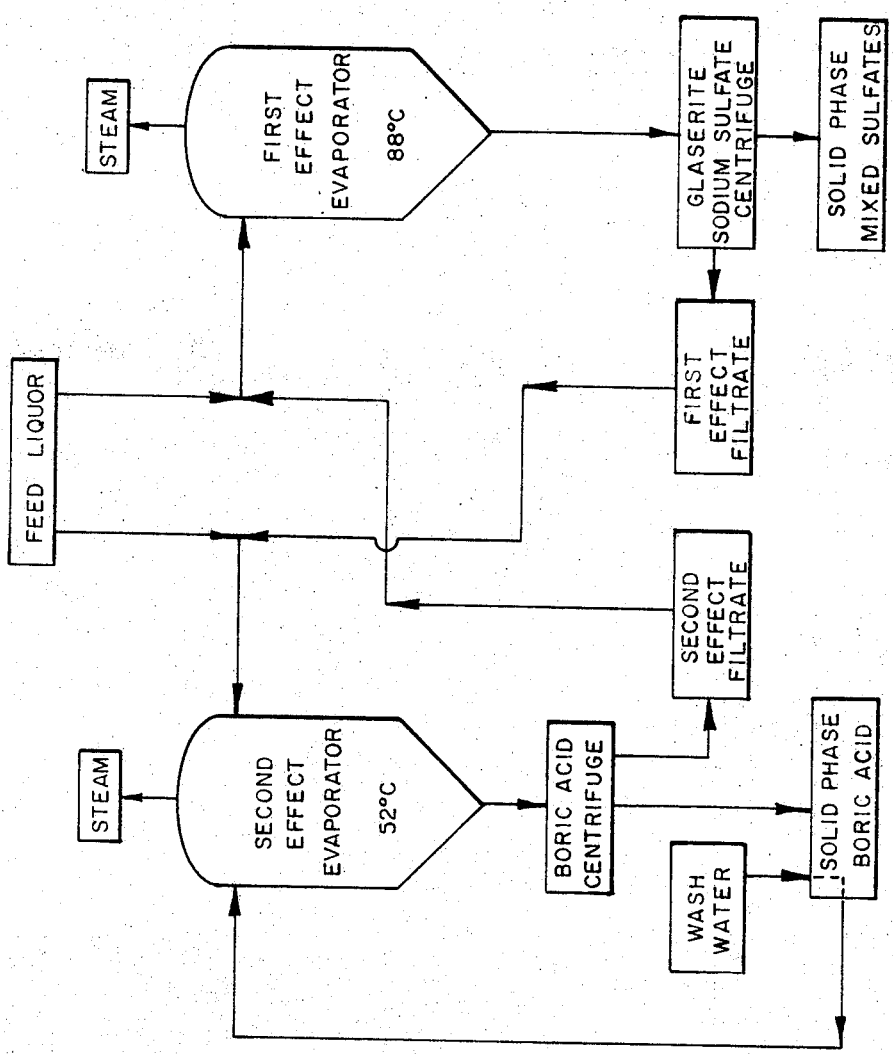

For a more complete understanding of the present invention, reference is made to the following description taken in conjunction with the appended drawings in which FIG. 1 is a triangular phase diagram representing the solubility and phase relations for the four component system $H_3BO_3$—$Na_2SO_4$—$K_2SO_4$—$H_2O$ at the temperatures of 35° C. and 75° C.; FIG. 2 is a graph representing the solubility of any of $H_3BO_4$, $K_2SO_4$ or $Na_2SO_4$ in the presence of NaCl; and FIG. 3 is schematic flow sheet of this process carried out continuously in a double effect evaporator.

FIG. 1 is a graphical representation of the phase relationships of the four component system $H_3BO_3$—$Na_2SO_4$—$K_2SO_4$—$H_2O$. Every liquid composition belonging to this system, which is at the point of saturation with respect to one or more phases, can be represented by a point on this phase diagram. Conversely, every point on this phase diagram represents the composition of a liquid which is saturated with respect to one or more of glaserite, boric acid, sodium sulfate or potassium sulfate. Points representing the liquid compositions of this system are plotted in FIG. 1 as weight percentages of the individual dissolved salt by weight of the total dissolved salts.

The invariant points and solid phase fields for this system are shown in FIG. 1. A line in FIG. 1 includes all those compositions which are in equilibrium at saturation with respect to the solid phase materials of the two fields touching that line. For example, every liquid mixture having a composition which falls upon line C–D in FIG. 1 at 75° C., is in equilibrium at its saturation point with respect to both boric acid and glaserite. Change in the water content of a liquid mixture is not evident from an examination of FIG. 1, since all liquid compositions containing the same ratio of dissolved salts are represented by a single point regardless of the water content.

It will be seen upon examination of FIG. 1 that the removal of a single component from the mixture will cause a point representing the composition of the changing mixture to move along a straight line including both the vertex representing the pure product being removed and the point representing the initial composition of the mixture. For example, as boric acid is crystallized from a liquid mixture, the change in composition of the liquid mixture is represented by a straight line including vertex A–a and the point representing the initial composition of the liquid mixture.

When the composition of a liquid mixture is in the glaserite field and glaserite is removed from the mixture, the course followed by the composition is represented by a straight line including point x and the point at which crystallization is initiated. Point x in FIG. 1 represents the composition of pure glaserite, which has the formula: $3K_2SO_4 \cdot Na_2SO_4$ and a composition by weight of 78.63% potassium sulfate and 21.37% sodium sulfate.

The change in the composition of the invariant points with the change in temperature is illustrated by dotted lines in FIG. 1. Thus, the dotted line D–d represents approximately the change in the position of that invariant point as the temperature of the liquid mixture represented by that point varies between 75° C. and 35° C.

Small arrows are drawn on those boundary lines which represent phase relationships of the system at 75° C. These arrows indicate the direction in which the composition of the liquid phase will move if crystallization is carried out by removal of water from the liquid mixture at a point in contact with one of the boundary lines. A point representing a mixture whose saturated solution is in contact with line G–D at 75° C. moves toward point D as crystallization is carried out, and both solid phase sodium sulfate and solid phase glaserite are removed from the mixture simultaneously. While these arrows are shown only on the solid lines at 75° C., the system behaves in the same way at 35° C. and at other temperatures ranging from the freezing to the boiling points of the mixture.

In commercial operation, the brines which are utilized as the feed material for the process of the present invention unavoidably contain trace amounts of other salts. These trace amounts of other salts have some slight effect upon the positioning of the invariant points in this system. However, these trace salts do not substantially alter the phase relationships illustrated in FIG. 1.

Brines useful as the raw materials for the process of the present invention may be derived directly from natural sources or may comprise residual liquors from treatment of brine derived from natural sources, or they may be prepared synthetically by admixing separate sources of the components of this system.

The composition and invariant points of any brine which is to be treated according to the present process can, if desired, by established for any temperature by known procedures, such as, for example, that described in John E. Teeple, The Industrial Development of Searles Lake Brines (1929), at pages 28 through 30.

Broadly, the present invention comprises bringing a first aqueous boric acid-sodium sulfate-potassium sulfate mixture to saturation with respect only to the boric acid at a first temperature. Solid boric acid is crystallized from this first mixture and the solid boric acid is removed from the mixture to leave a second aqueous boric acid-sodium sulfate-potassium sulfate mixture. The second aqueous mixture is heated to a second temperature which is above the first temperature. The second aqueous mixture is brought to saturation at the second temperature with respect to a solid salt which may be any one of sodium sulfate, glaserite or potassium sulfate. Solid salt is crystallized from the second mixture and the solid salt is removed from the second mixture to produce a third aqueous boric acid-sodium sulfate-potassium sulfate mixture. Preferably, the third mixture is admixed with a dilute aqueous mixture containing boric acid-sodium sulfate-potassium sulfate to produce the first aqueous boric acid-sodium sulfate-potassium sulfate mixture which is used as the feed material in the present process.

Generally, the second temperature in this process is more than about 20° C. higher than the first and, preferably, it is more than about 30° C. higher. Generally, it is possible to achieve a more efficient process when the difference between the first and second temperatures is more than about 25° C.

During the crystallization steps, preferably, crystallization is carried to the point where the aqueous mixture is almost saturated with respect to at least one additional solid phase.

A preferred procedure for the recovery of substantially pure boric acid from the four component system $$H_3BO_3—Na_2SO_4—K_2SO_4—H_2O$$

is to select a liquid mixture falling in the boric acid field at about 35° C. and evaporate water from it until the mixture reaches saturation. Continued evaporation of water causes crystallization of boric acid until the composition of the mixture is close to one of the three boundary lines ed, cd and cb in FIG. 1. Just before the composition of the liquid touches this boundary line, the solid boric acid is removed and the mixture is heated to a higher temperature which, in effect, moves the boundary line away from the point representing the liquid mixture, thus placing the composition in a different solid phase field. The evaporating and crystallization procedures are then repeated until the composition of the liquid is again brought close to a boundary line. The solid salt crystallized in this step is removed leaving a residual filtrate.

Preferably, the residual filtrate, which is somewhat concentrated, is admixed with fresh dilute brine; the mixture is then subjected to the present process. When this preferred procedure is used, substantially all of the boric acid is recovered from the dilute incoming brine.

The phase relationships of this system are generally similar to those illustrated in FIG. 1 at temperatures between substantially the atmospheric boiling points and freezing points of the system. Because of this similarity it is possible to carry out this process at substantially any temperature within this range to produce substantially pure boric acid. Below temperatures of about 25 to 35° C. one additional solid phase appears, which is composed of various hydrates of sodium sulfate, but this does not materially alter the sequence or the effect of the steps in this process.

In the specification, appended claims and following examples, all parts and percentages are by weight unless otherwise indicated. The following examples are submitted to illustrate and not to limit the invention.

EXAMPLE I

This example is illustrative of the sequential separation of boric acid and glaserite from the four component system $H_3BO_3—Na_2SO_4—K_2SO_4—H_2O$, at two different temperatures, to produce substantially pure boric acid and substantially pure glaserite.

Water is evaporated from a fresh dilute brine containing:

$H_3BO_3$—6.5% by weight of the solution,
$Na_2SO_4$—5.0% by weight of the solution, and
$K_2SO_4$—4.0% by weight of the solution;

until the composition of the solution phase reaches the point at which it is just saturated with respect to boric acid at 35° C. The removal of water is continued until the solution phase of this mixture reaches the point at which it is just saturated with respect to glaserite. During this evaporative step, boric acid crystallizes and is removed by filtration. The mixture which is just saturated with respect to glaserite is heated to a temperature of 75° C. At this temperature, water is again evaporated from the mixture until it reaches the point at which the solution is just saturated with respect to glaserite. Evaporation of water is continued, with attendant precipitation of glaserite, until the solution is just saturated with respect to boric acid.

The results obtained in this sequence of evaporative and heating steps, are graphically illustrated by reference to FIG. 1. The composition of the starting solution given above, expressed on a different basis, is shown in Table I.

*Table I*

|  | Grams of Salt per 100 g. H₂O | Percent of Total Dissolved Salts, percent |
|---|---|---|
| H₃BO₃ | 7.70 | 42.0 |
| Na₂SO₄ | 5.91 | 32.2 |
| K₂SO₄ | 4.74 | 25.8 |

Plotting the initial composition of the mixture on FIG. 1 establishes point 1. Water is evaporated from this composition until the liquid phase is saturated with boric acid at 35° C. The composition intersects the boric acid field, *abcdea*, at point 2. Points 2 and 1 coincide on the phase diagram. As evaporation of water is continued the composition of the solution in the mixture varies along a straight line including points 2 and a, until the solution is just saturated with respect to glaserite at point 3. Solid phase borice acid is removed from the mixture. This change in composition during crystallization is represented by dashed line 2–3. The composition of point 3 is determined from FIG. 1 and is found to be that set forth in Table II.

*Table II*

Percent by weight of the total dissolved salts

H₃BO₃ ———————————————————————— 26.4
Na₂SO₄ ———————————————————————— 40.9
K₂SO₄ ————————————————————————— 32.7

At point 3, boric acid and water have been removed, leaving the original quantities of potassium sulfate and sodium sulfate in the aqueous mixture. Using the percentages from Table II and the known weight of either sodium sulfate or potassium sulfate, it is calculated that there are 14.48 grams of dissolved salts in the liquid mixture at point 3, as compared to the 18.35 grams of dissolved salt per 100 grams of water in the liquid mixture at point 1. There are 3.83 grams of boric acid present in the mixture at point 3, so 3.86 grams of boric acid have been removed by crystallization. The yield of boric acid, based on the original 7.7 grams, is about 49%.

The mixture, having a composition of point 3, is now heated to a temperature of 75° C. The phase characteristics of this system at 75° C. are represented by the solid lines in FIG. 1. It is again necessary to evaporate water in order to bring the composition to the saturation point which is represented by point 4. As water is removed by evaporation, the weight percentage composition of the dissolved salts remains constant so that points 3 and 4 coincide in FIG. 1. When point 4 is reached, solid glaserite ($3K_2SO_4 \cdot Na_2SO_4$) appears in the mixture, and as additional water is evaporated, the composition of the mixture varies along the straight line including point $x$ and point 4 until it reaches line DG at point 5. At this point the mixture is saturated with respect to both glaserite and sodium sulfate. The glaserite is removed leaving a residual filtrate having the composition of point 5.

At point 5 the mixture contains 10.91 grams of dissolved salt as compared to the 14.48 grams of dissolved salt at point 3. By difference it is determined that 3.57 grams of glaserite have been precipitated out along line 4-5. Since the composition of glaserite by weight percent is 78.63% $K_2SO_4$ and 21.37% $Na_2SO_4$, 0.76 gram of sodium sulfate and 2.81 grams of potassium sulfate have been crystallized in moving from point 4 to point 5. The composition of the residual filtrate at point 5 is that shown in Table III.

*Table III*

|  | Grams of Salt per 100 g. H₂O | Percent of Total Dissolved Salts, percent |
|---|---|---|
| $H_3BO_3$ | 3.84 | 35.1 |
| $Na_2SO_4$ | 5.19 | 47.4 |
| $K_2SO_4$ | 1.92 | 17.5 |

EXAMPLE II

This example is illustrative of the process of this invention utilizing, as the initial feed brine, a mixture of the residual filtrate obtained in the last step of Example I admixed with dilute fresh brine having a composition represented by point 1 in FIG. 1.

The residual filtrate from Example I, having the composition shown in Table III, is admixed with dilute fresh brine which has the composition set forth in Table I. The resulting mixture has a composition represented by point 6 in FIG. 1. Water is evaporated from this mixture at 35° C. until the liquid composition is saturated with boric acid. Evaporation of water is continued and crystallization of boric acid takes place until the composition of the liquid mixture contacts line c–d at point 7. The temperature of the mixture is raised to 75° C. and it is brought to saturation with respect to glaserite. Water is evaporated from the saturated solution in the mixture and glaserite is crystallized out until the mixture contacts line D–G at point 8. Between points 7 and 8, only glaserite has been precipitated from this mixture. At point 8 a second phase consisting of sodium sulfate appears. Evaporation of water is continued and the liquid composition moves along line D–G, while both glaserite and sodium sulfate crystallize out, until it reaches point D.

The results of this example are set forth below:

*Table IV*

Point 6—Initial mixture: Weight percent of dissolved salts
- $H_3BO_3$ _____ 39
- $Na_2SO_4$ _____ 39
- $K_2SO_4$ _____ 22

The following calculations are based, for convenience, on 100 grams of total dissolved salts at point 6:

- Grams $H_3BO_3$ in solution _____ 39
- Grams $Na_2SO_4$ in solution _____ 39
- Grams $K_2SO_4$ in solution _____ 22

*Table V*

Point 7—Boric acid removed: Weight percent of dissolved salts
- $H_3BO_3$ _____ 24.6
- $Na_2SO_4$ _____ 48.1
- $K_2SO_4$ _____ 27.3

Grams
- Grams of total dissolved salt _____ 80.6
- Grams $H_3BO_3$ in solution _____ 19.6
- Grams $Na_2SO_4$ in solution _____ 39
- Grams $K_2SO_4$ in solution _____ 22
- Grams $H_3BO_3$ removed _____ 19.4

*Table VI*

Point 8—Glaserite ($3K_2SO_4$—$Na_2SO_4$) Weight percent of removed: dissolved salts
- $H_3BO_3$ _____ 30.0
- $Na_2SO_4$ _____ 52.0
- $K_2SO_4$ _____ 18.0

Grams
- Grams of total dissolved salts _____ 65.4
- Grams $H_3BO_3$ in solution _____ 19.6
- Grams $Na_2SO_4$ in solution _____ 34.0
- Grams $K_2SO_4$ in solution _____ 11.8
- Grams glaserite removed _____ 15.2
- Grams $Na_2SO_4$ removed _____ 3.2
- Grams $K_2SO_4$ removed _____ 12.0

*Table VII*

Point D—Glaserite and Weight percent of
$Na_2SO_4$ removed: dissolved salts
- $H_3BO_3$ _____ 36.0
- $Na_2SO_4$ _____ 46.6
- $K_2SO_4$ _____ 17.4

Grams
- Grams of total dissolved salts _____ 54.4
- Grams $H_3BO_3$ in solution _____ 19.6
- Grams $Na_2SO_4$ in solution _____ 25.3
- Grams $K_2SO_4$ in solution _____ 9.5
- Grams $K_2SO_4$ removed in glaserite _____ 2.3
- Grams glaserite removed _____ 2.9
- Grams $Na_2SO_4$ removed in glaserite _____ 0.6
- Grams solid $Na_2SO_4$ removed _____ 8.1

As is shown in the above numerical summaries of this process, 19.4 grams of boric acid are removed from the mixture for every 100 grams of total dissolved salts in the initial feed brine, also 13.7 grams of sodium sulfate are removed and 12.5 grams of potassium sulfate. Stated on a weight percent basis, this process in one cycle results in about a 50% recovery of dissolved boric acid, 35% recovery of dissolved sodium sulfate and 57% recovery of dissolved potassium sulfate. Carrying out this process continuously with recycle of the residual filtrate at point 8 or at point D to the feed liquor substantially increases these yields.

This example is repeated, admixing the residual filtrate having the composition of point D and dilute fresh brine having the composition of point 1 to give an initial feed brine having the approximate composition of point 6. Substantially the same yields of boric acid, potassium sulfate and sodium sulfate obtained in Example II are achieved.

Example II is repeated except that the residual filtrate which is admixed with fresh dilute brine to prepare the feed brine for this example is obtained from a glaserite crystallization step which is carried out at 90° C. The procedures followed are substantially the same as those employed in Example II and a higher yield of boric acid is obtained.

Preferably, the fresh raw material will have a composition falling substantially inside the boric acid field at the boric acid crystallization temperature. However, if the available brine does not have such a composition, it is possible to bring the composition of this brine within the borid acid field by first crystallizing one of sodium sulfate, glaserite, or potassium sulfate, or a mixture of these salts from the brine, above the temperature at which the boric acid crystallization step is to be carried out. For example, a brine solution is used in which the dissolved salts have the following composition:

Table VIII

Point 9—Initial dilute feed:

| Component | Weight percent of dissolved salts |
|---|---|
| $H_3BO_3$ | 15 |
| $Na_2SO_4$ | 80 |
| $K_2SO_4$ | 5 |

This brine having the composition of point 9 on FIG. 1 is heated to 75° C. and water is evaporated from the brine, with attendant crystallization of sodium sulfate, until the mixture reaches the composition of point 10. The composition of point 10 is diluted with water and cooled to 35° C. and boric acid is crystallized out of this mixture until the composition reaches point 11. At point 11 the temperature of the mixture is elevated to 75° C. and crystallization is again carried out with attendant removal of sodium sulfate and glaserite until the mixture reaches a composition of point D.

The mixture of composition D is then admixed with fresh dilute brine having the composition of point 9 to produce a mixture having, for example, the composition of point 12.

Using a mixture having the composition of point 12 as the feed brine for the present process results in a residual filtrate having the composition of point D, which filtrate can be admixed with more fresh dilute brine having the composition of point 9 so that a continuous process has been established wherein the composition of the feed brine is brought within the boric acid field by the simple expedient of admixing dilute fresh brine with residual filtrate. Similar procedures may be carried out to bring the dilute fresh brine from any one of the sodium sulfate, glaserite or potassium sulfate fields into the boric acid field if the composition of the brine is such that this is required.

The aqueous mixtures which can be used as the raw material for this process contain boric acid, sodium sulfate and potassium sulfate and may in addition contain minor amounts of other materials. The individual concentrations of boric acid, sodium sulfate and potassium sulfate in the raw material can vary from a trace up to the saturation point of these components. Other materials which may be present in minor amounts in the raw material include, for example, sodium chloride, potassium chloride, sodium carbonate, potassium carbonate, borates, and the like.

The location of the invariant points and phase boundaries in FIG. 1 may be altered somewhat by the presence of dissolved salts other than boric acid, sodium sulfate and potassium sulfate. Even though the presence of additional salts may alter the phase diagram it is generally possible to determine the operating limits for the process using FIG. 1 and information obtained from a diagram such as FIG. 2, drawn for the aqueous mixture involved.

FIG. 2 shows the effect of sodium chloride concentration on the position of the invariant point D, in FIG. 1, at 50° C. FIG. 2 is drawn for the system,

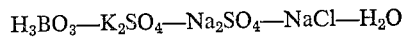

$$H_3BO_3—K_2SO_4—Na_2SO_4—NaCl—H_2O$$

which often occurs in commercial practice. Every point on each of the three curves in FIG. 2 is saturated with respect to boric acid, sodium sulfate and glaserite. The three curves in FIG. 2 show, respectively, the weight percent of boric acid, potassium sulfate and sodium sulfate by weight of the total dissolved salts versus the weight percent of sodium chloride by weight of the total dissolved salts. For any given concentration of sodium chloride the concentration of boric acid, sodium sulfate and potassium sulfate in the liquid at the invariant point D can be ascertained. The weight percentages obtained from the curves in FIG. 2 are based on the total weight of dissolved salts including sodium chloride, so these percentages must be converted to weight percentage based on only dissolved boric acid, potassium sulfate and sodium sulfate before they can be plotted on FIG. 1. Plotting these converted weight percentages on FIG. 1 establishes the position of the invariant point at which sodium sulfate, glaserite and boric acid are in equilibrium at the predetermined sodium chloride concentration and temperature for which FIG. 2 is drawn. For example, an aqueous mixture of boric acid, potassium sulfate, sodium sulfate and sodium chloride, containing 24 weight percent sodium chloride by weight of the dissolved salts, at 50° C. has the invariant point $t$ wherein the liquor is saturated with respect to each of sodium sulfate, glaserite and boric acid.

The position of any invariant point in FIG. 1 can be established by an analogous procedure; however, generally only the position of the invariant point whereat sodium sulfate, glaserite and boric acid are in equilibrium need be established since this is the ultimate end point of crystallization for this system, around which crystallization is generally carried out.

Example III is illustrative of this process carried out continuously on the system

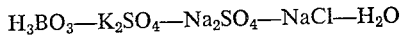

$$H_3BO_3—K_2SO_4—Na_2SO_4—NaCl—H_2O$$

EXAMPLE III

A double effect evaporator is used to carry out this continuous process. This continuous process is illustrated schematically in FIG. 3. Mixed glaserite and sodium sulfate are crystallized out in the first effect and boric acid in the second. Attached to each effect is a centrifuge wherein the filtrate in that effect is separated from the crystals produced in that effect. The filtrate from the first effect is recycled and admixed with the feed liquor for the second effect. The filtrate from the second effect is recycled to become part of the feed for the first effect. Feed liquor is supplied to both effeects. Steam and solid phase materials are removed from each effect.

The composition of the feed liquor is shown in Table IX.

Table IX

| Component: | Weight percent of brine |
|---|---|
| $H_3BO_3$ | 6.39 |
| $K_2SO_4$ | 4.91 |
| $Na_2SO_4$ | 4.78 |
| NaCl | 0.20 |
| $H_2O$ | 83.72 |

The first effect is operated at 88° C. and the second effect is operated at 52° C. Feed liquor is supplied to the evaporator at a flow rate of 762 pounds per minute. Solid phase boric acid is produced at the rate of 46 pounds per minute which is washed with 42 pounds of water per minute. Mixed sulfate filter cake and entrained liquor is produced at the rate of 82 pounds per minute. The composition of the mixed sulfate filter cake is shown in Table X:

Table X

| Component: | Weight percent of filter cake |
|---|---|
| Solids: | |
| $K_2SO_4$ | 43.9 |
| $Na_2SO_4$ | 43.6 |
| Entrained liquor: | |
| $H_3BO_3$ | 2.7 |
| $K_2SO_4$ | 0.3 |
| $Na_2SO_4$ | 0.3 |
| NaCl | 1.8 |
| $H_2O$ | 6.4 |
| | 100.0 |

Steam is removed at the rate of 338 pounds per minute from each effect.

The flow rates of the streams between the two effects are as follows:

The feed to the second effect is composed of 610 pounds per minute of feed liquor and 415 pounds per minute of first effect filtrate; the feed to the first effect consists of 152 pounds per minute of feed liquor and 683 pounds per minute of second effect filtrate; the composition of the liquor in the second effect is shown in Table XI and that of the first effect is shown in Table XII.

Table XI

| Component: | Weight percent of liquor |
|---|---|
| $H_3BO_3$ | 11.63 |
| $K_2SO_4$ | 10.79 |
| $Na_2SO_4$ | 6.12 |
| NaCl | 8.86 |
| $H_2O$ | 62.60 |
| | 100.00 |

Table XII

| Component: | Weight percent of liquor |
|---|---|
| $H_3BO_3$ | 21.00 |
| $K_2SO_4$ | 10.55 |
| $Na_2SO_4$ | 3.04 |
| NaCl | 14.31 |
| $H_2O$ | 51.10 |
| | 100.00 |

The yield of substantially pure boric acid, based on that present in the feed liquor, is about 96% without washing the mixed sulfate filter cake to recover the boric acid entrained in that cake. Substantially 100% recovery of boric acid can be achieved by washing the mixed sulfate filter cake and recycling the wash solution to the process.

The process of this invention can be carried out in any convenient manner, for example, using continuous, semi-continuous, batch countercurrent or co-current procedures. Conveniently, this process is carried out continuously by establishing first and second aqueous mixtures having such compositions that the first is saturated with respect to boric acid and nothing else while the second is saturated with respect to one or more of the sulfate salts, sodium sulfate, potassium sulfate or glaserite. The compositions of the first and second mixtures are maintained by the continuous addition of aqueous mixtures containing boric acid, potassium sulfate and sodium sulfate and continuously generating and withdrawing, respectively, solid phase boric acid and solid phase sulfate salts. Preferably, efficient continuous operation is achieved by continuously conducting a portion of the second aqueous mixture to the first and a portion of the first to the second. This is conveniently accomplished by conducting the filtrate streams, which are separated from the boric acid product and the solid sulfate salts, to the second and first effects, respectively.

Preferably, the first aqueous mixture, wherein solid phase boric acid is produced, is maintained at a temperature of from about 35° C. to 65° C. while the second aqueous mixture is maintained at a temperature of from about 65° C. to 100° C. There is preferably a temperature differential between these two mixtures of more than about 10° C. Preferably, the pressures over these aqueous mixtures are adjusted to established the boiling points of these mixtures at the predetermined operating temperatures.

While this invention has been described particularly with reference to the system:

$$H_3BO_3\text{—}K_2SO_4\text{—}Na_2SO_4\text{—}H_2O$$

and this system containing minor amounts of other salts, such as sodium chloride, it will be understood that this invention can also be practiced with the systems:

$$H_3BO_3\text{—}KCl\text{—}NaCl\text{—}H_2O$$

and $H_3BO_3$—$KHCO_3$—$NaHCO_3$—$H_2O$, and the like, and these systems containing minor amounts of other salts.

As will be understood by those skilled in the art, what has been described is the preferred embodiment of the invention; however, many modifications, changes and substitutions can be made therein without departing from the scope and the spirit of the following claims.

What is claimed is:

1. A cyclic process for the continuous recovery of solid phase boric acid and solid phase sulfate salts from a dilute aqueous feed solution containing boric acid, sodium sulfate and potassium sulfate which comprises
   (a) evaporating water from said feed solution at a temperature of from about 35° to 65° C. to produce a first aqueous mixture which is saturated with respect to boric acid,
   (b) continuing the heating at said temperature to evaporate water from said first aqueous mixture to continuously form solid phase boric acid,
   (c) continuously recovering said solid phase boric acid to leave a second aqueous mixture containing boric acid, sodium sulfate and potassium sulfate which is saturated with respect to at least one of the sulfate salts selected from the group consisting of sodium sulfate, potassium sulfate and glaserite,
   (d) heating said second aqueous mixture at least 10° C. higher than the temperature used in step (a) above to a temperature within the range of 65° to 100° C. and evaporating water therefrom to continuously form at least one of said sulfate salts in solid phase,
   (e) continuously recovery said solid phase salt to leave a third aqueous mixture and
   (f) continuously recycling said third aqueous mixture for treatment with additional quantities of said aqueous feed solution.

2. A process as set forth in claim 1 in which said solid phase boric acid and solid phase sulfate salts are formed in separate evaporation zones.

3. A process as set forth in claim 1 in which said feed solution also contains minor amounts of sodium chloride, potassium chloride, sodium carbonate, potassium carbonate and borates.

References Cited

UNITED STATES PATENTS

| 1,888,391 | 11/1932 | Newman | 23—149 |
| 1,950,106 | 3/1934 | Franke | 23—149 |
| 2,089,557 | 8/1937 | Jacobi | 23—149 X |
| 2,104,009 | 11/1938 | Burke | 23—149 |
| 2,948,592 | 8/1960 | May | 23—149 |

FOREIGN PATENTS

| 474,763 | 6/1951 | Canada. |
| 510,421 | 10/1930 | Germany. |
| 294,236 | 4/1929 | Great Britain. |
| 861,416 | 2/1961 | Great Britain. |

NORMAN YUDKOFF, *Primary Examiner.*

S. J. EMERY, *Assistant Examiner.*